(12) United States Patent
Bo et al.

(10) Patent No.: US 8,923,454 B2
(45) Date of Patent: Dec. 30, 2014

(54) METHOD, APPARATUS AND SYSTEM FOR ELIMINATING ALIASING NOISE IN MULTI-CARRIER MODULATION SYSTEM

(75) Inventors: Huijian Bo, Shenzhen (CN); Tao Wu, Shenzhen (CN); Yongjun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/354,160

(22) Filed: Jan. 19, 2012

(65) Prior Publication Data

US 2012/0114063 A1  May 10, 2012

Related U.S. Application Data

(63) Continuation of application No. PCT/CN2010/071377, filed on Mar. 29, 2010.

(30) Foreign Application Priority Data

Aug. 27, 2009  (CN) .......................... 2009 1 0189901

(51) Int. Cl.
  *H04B 15/00* (2006.01)
  *H04L 27/26* (2006.01)
  *H04L 25/03* (2006.01)
(52) U.S. Cl.
  CPC ... *H04L 27/2647* (2013.01); *H04L 2025/03414* (2013.01)
  USPC ........... 375/346; 375/221; 375/222; 375/223; 375/231; 375/254; 375/302; 375/322; 375/296
(58) Field of Classification Search
  CPC ..... H04B 1/0475; H04L 27/01; H04L 1/0042
  USPC ......... 375/221–223, 231, 232, 254, 296, 302, 375/322, 346
  See application file for complete search history.

(56) References Cited

U.S. PATENT DOCUMENTS 6,611,794 B1 * 8/2003 Fleming-Dahl ............... 702/191
6,693,957 B1 * 2/2004 Wingrove et al. ............. 375/222

(Continued)

FOREIGN PATENT DOCUMENTS

| CN | 1805418 A | 7/2006 |
| CN | 1866938 A | 11/2006 |

(Continued)

OTHER PUBLICATIONS

International Search Report dated Jul. 8, 2010 in connection with International Patent Application No. PCT/CN2010/071377.

(Continued)

*Primary Examiner* — Kenneth Lam
*Assistant Examiner* — Ross Varndell

(57) ABSTRACT

A method, an apparatus and a system for eliminating aliasing noise in a multi-carrier modulation system are disclosed. The method includes: acquiring a first power spectrum density template; acquiring information of in-band subcarriers whose aliasing noise is greater than background noise, and acquiring a difference between the aliasing noise and the background noise of the in-band subcarriers; adjusting the first power spectrum density template according to the information of the in-band subcarriers and the corresponding difference to obtain a second power spectrum density template; and sending signals according to the second power spectrum density template. The method, the apparatus, and the system disclosed herein eliminate the aliasing crosstalk noise, improve the performance and stability of in-band services without involving upgrade or modification of the Customer Premises Equipment (CPE), and are easy to implement.

6 Claims, 5 Drawing Sheets

(56) References Cited

U.S. PATENT DOCUMENTS

| | | |
|---|---|---|
| 2006/0228113 A1 | 10/2006 | Cutillo et al. |
| 2007/0109974 A1 | 5/2007 | Cutillo et al. |
| 2007/0237214 A1 | 10/2007 | Duvaut et al. |
| 2008/0013611 A1* | 1/2008 | Stolle .......................... 375/222 |
| 2008/0192813 A1 | 8/2008 | Stolle et al. |
| 2010/0046738 A1* | 2/2010 | Schelstraete et al. .... 379/406.01 |

FOREIGN PATENT DOCUMENTS

| | | |
|---|---|---|
| CN | 101047682 A | 10/2007 |
| CN | 101174855 A | 5/2008 |
| EP | 0 942 547 A1 | 9/1999 |
| EP | 1 876 784 A1 | 1/2008 |
| FR | 2559144 A1 | 8/1985 |
| JP | 11039323 A | 2/1990 |
| JP | 2226981 A | 9/1990 |
| WO | WO 2008/045332 A2 | 4/2008 |

OTHER PUBLICATIONS

Written Opinion of the International Searching Authority dated Jul. 8, 2010 in connection with International Patent Application No. PCT/CN2010/071377.

Supplementary European Search Report dated Mar. 5, 2012 in connection with European Patent Application No. EP 10 81 1134.

Kee Bong Song, et al., "Dynamic Spectrum Management for Next-Generation DSL Systems", IEEE Communications Magazine, Oct. 2002, p. 101-109.

"Physical layer management for digital subscriber line (DSL) transceivers", ITU-G997.1, Apr. 22, 2009, p. 115-118.

Chinese Search Report dated Nov. 12, 2012 in connection with Chinese Patent Application No. 2009101899019.

* cited by examiner

Sampling frequency/2    Sampling frequency

METHOD, APPARATUS AND SYSTEM FOR ELIMINATING ALIASING NOISE IN MULTI-CARRIER MODULATION SYSTEM

CROSS-REFERENCE TO RELATED APPLICATIONS

This application is a continuation of International Application No. PCT/CN2010/071377, filed on Mar. 29, 2010, which claims priority to Chinese Patent Application No. CN200910189901.9, filed with the Chinese Patent Office on Aug. 27, 2009 and entitled "METHOD, APPARATUS AND SYSTEM FOR ELIMINATING ALIASING NOISE IN MULTI-CARRIER MODULATION SYSTEM", both of which are hereby incorporated by reference in its entirety.

TECHNICAL FIELD

The present invention relates to communication technologies, and in particular, to a method, an apparatus, and a system for eliminating aliasing noise in a multi-carrier modulation system.

BACKGROUND

Digital Subscriber Line (DSL) is a high-speed transmission technology that uses Unshielded Twist Pairs (UTPs) to transmit data, and comes in the following types: Asymmetrical Digital Subscriber Line (ADSL), Very-high-bit-rate Digital Subscriber Line (VDSL), ISDN-based Digital Subscriber Line (IDSL, where ISDN represents Integrated Services Digital Network), Single-pair High-bit-rate Digital Subscriber Line (SHDSL), Asymmetrical Digital Subscriber Line 2 (ADSL2), Asymmetrical Digital Subscriber Line 2plus (ADSL2plus) and Very-high-bit-rate Digital Subscriber Line 2 (VDSL2), etc.

In all sorts of xDSL technologies except IDSL and SHDSL, passband transmission is commonly used, and a Frequency Division Multiplexing (FDM) technology is utilized to make the DSL and the Plain Old Telephone Service (POTS) coexist on the same UTP, in which the DSL occupies the high frequency band and the POTS occupies the baseband part which is lower than 4 KHz, the POTS signals are separated from the DSL signals through a splitter, or the POTS signals are combined with the DSL signals through a combiner. The passband transmission-based xDSL employs a Discrete Multi-Tone (DMT) modulation technology for modulation and demodulation.

With the development of the DSL technology, the transmission rate is higher and higher, and the spectral range is wider and wider, in practical applications, there are application scenes in which many different DSL are used to build a net, thus crosstalk noise affects services increasingly. As shown in FIG. 1, a transceiver of a roadside cabinet 102 shares a bundle of cables with a transceiver of an equipment room 100 of a local Central Office (CO). A signal sent by the transmitter of the CO equipment room 100 reaches the far end after being transmitted for a length (E-side length). Due to attenuation, the signal arriving at the far end is weak, if the amplitude of the signal sent by the transmitter of the roadside cabinet 102 exceeds a specific amplitude value, such signal imposes serious crosstalk on the signal sent by the transmitter of the CO equipment room 100, thus affects performance and stability of the signal sent by the transmitter of the CO equipment room 100, or even leads to the user to loss their connection.

As shown in FIG. 2, suppose that the transmitter of the CO equipment room 100 sends ADSL signals, the transmitter of the roadside cabinet 102 sends VDSL signals, and the ASDL signal arriving at the roadside cabinet 102 is ADSL signal 200. Since the amplitude of the VDSL signal sent by the roadside cabinet 102 exceeds a specific amplitude value, the VSDL signal sent by the transmitter of the roadside cabinet 102 causes crosstalk noise 202 and crosstalk noise 204 to the ADSL signal 200, and the crosstalk noise is aliased into the band to form an aliasing noise, which affects the performance and stability of the ADSL signal 200.

In the prior art, a solution to reducing the influence of the crosstalk caused by the signals sent by the roadside cabinet 102 to the ADSL signal 200 is to reduce the power of the signals sent by the transmitter of the roadside cabinet 102, namely, to perform Downstream Power Back Off (DPBO). As shown in FIG. 3, after the process of DPBO, the signals sent by the transmitter of the roadside cabinet 102 cause less crosstalk to the ADSL signals 200, and theoretically, the crosstalk is not aliased into the band to affect the ADSL signals 200. However, since most modems available now are not much capable of anti-aliasing filtering, therefore, after the process of DPBO, the crosstalk noise generated by the signals sent by the transmitter of the roadside cabinet 102 is actually aliased into the band. As shown in FIG. 4, the aliasing noise in the band affects the performance and stability of in-band signals.

SUMMARY

The embodiments of the present invention provide a method, an apparatus, and a system for eliminating aliasing noise in a multi-carrier modulation system, the provided method, apparatus and system can eliminate the crosstalk noise aliased into the band from out-band subcarriers.

The embodiments of the present invention provide a method for eliminating aliasing noise in a multi-carrier modulation system. The range covered by the frequency of the subcarriers of the multi-carrier modulation system is divided into at least two non-overlapping bands which include a first band and a second band, where each band includes one or more subcarrier frequencies. The method includes:

acquiring a first power spectrum density template of subcarriers in the second band;

acquiring carrier information of the subcarriers in the first band, and acquiring a difference between the aliasing noise and a background noise of the subcarriers in the first band;

adjusting the first power spectrum density template according to the carrier information of the subcarriers in the first band and the corresponding difference to obtain a second power spectrum density template; and sending subcarrier signals in the second band according to the second power spectrum density template.

The embodiments of the present invention provide a CO device, which includes:

a first acquiring unit, configured to acquire a first power spectrum density template of subcarriers in a second band;

a second acquiring unit, configured to acquire information of subcarriers in a first band, and acquire a difference between a aliasing noise and a background noise of the subcarriers in the first band, where the first band does not overlap the second band;

an adjusting unit, configured to adjust the first power spectrum density template according to the information of the subcarriers in the first band and the corresponding difference acquired by the second acquiring unit to obtain a second power spectrum density template; and a user interface unit, configured to send subcarrier signals in the second band according to the second power spectrum density template.

The embodiments of the present invention provide a multi-carrier communication system, which includes a first CO device and a second CO device, in which the first CO device is connected with the second CO device.

The first CO device is configured to send subcarrier in a first band;

The second CO device is configured to acquire a first power spectrum density template of subcarriers in a second band, and acquire carrier information about subcarriers in the first band, and calculate a difference between a aliasing noise and a background noise of subcarriers in the first band; after acquiring the carrier information about subcarriers in the first band and the corresponding difference, adjust the first power spectrum density template according to the information of the subcarriers in the first band and the corresponding difference to obtain a second power spectrum density template; after acquiring the second power spectrum density template, send subcarrier signals in the second band according to the second power spectrum density template, where the second band does not overlap the first band.

Through the method, apparatus and system provided by the embodiments of the present invention, the difference between the aliasing noise and the original background noise can be acquired after the process of DPBO is performed, and the transmitting power of the out-band subcarriers is adjusted according to the difference. Since the difference is generated as a result of aliasing crosstalk noise, adjusting the transmitting power of the out-band subcarriers according to the difference can eliminate the aliasing crosstalk noise, which improves the performance and stability of the in-band services. This process does not involve upgrade or modification of the Customer Premises Equipment, and is easy to implement.

BRIEF DESCRIPTION OF THE DRAWINGS

To illustrate the technical schemes of the embodiments of the present invention or in the prior art more clearly, the following outlines the accompanying drawings involved in the description of the embodiments of the present invention or the prior art. Apparently, the accompanying drawings outlined below are illustrative rather than exhaustive, and persons of ordinary skill in the art can derive other drawings from them without any creative effort.

DETAILED DESCRIPTION

The following detailed description is given in conjunction with the accompanying drawings to provide a thorough understanding of the present invention. Evidently, the drawings and the detailed description are merely representative of particular embodiments of the present invention rather than all embodiments. All other embodiments, which can be derived by those skilled in the art from the embodiments given herein without any creative effort, shall fall within the protection scope of the present invention.

The embodiments of the present invention provide a method, an apparatus and a system for eliminating aliasing noise in a multi-carrier modulation system. Especially, in the multi-carrier modulation system according to the embodiments of the present invention, the range of frequency of the subcarriers is divided into at least two non-overlapping bands which comprise a first band and a second band, where each band includes one or more subcarrier frequencies. For example, in some scenarios of hybrid networking, multiple CO devices transmit service to remote users through a bundle of cables, and each CO device sends signals through a corresponding band thereof. The crosstalk on this bundle of cables caused by subcarriers of the multiple CO devices causes impact to services. For example, the subcarriers in the first band of the CO equipment room which acting as a first CO device and the subcarriers in the second band of a roadside cabinet which acting as a second CO device are transmitted to the CPE through the same bundle of cables. When the power of subcarriers of the roadside cabinet exceeds a specific amplitude, the subcarriers from the roadside cabinet cause crosstalk noise to the subcarriers from the device in the CO equipment room. Since the filtering performance of anti-aliasing filters of most modems available now is poor, the crosstalk noise generated by the subcarriers of the roadside cabinet is aliased into the subcarriers from the device in CO equipment room, and caused crosstalk noise to the subcarriers from the device in CO equipment room. The aliased crosstalk noise forms aliasing noise.

Figure 1:
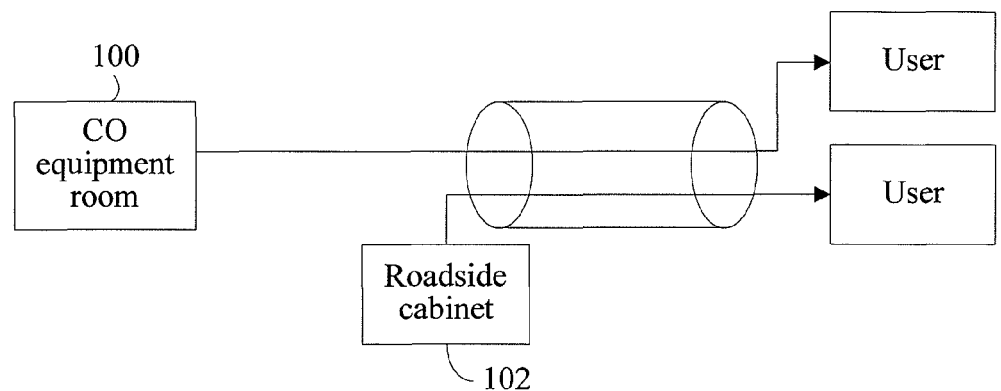
FIG. 1 is a schematic diagram of an architecture for transmitting signals of a device in a CO equipment room and signals of a roadside cabinet to a user through the same bundle of cables according to the prior art.
Figure 2:
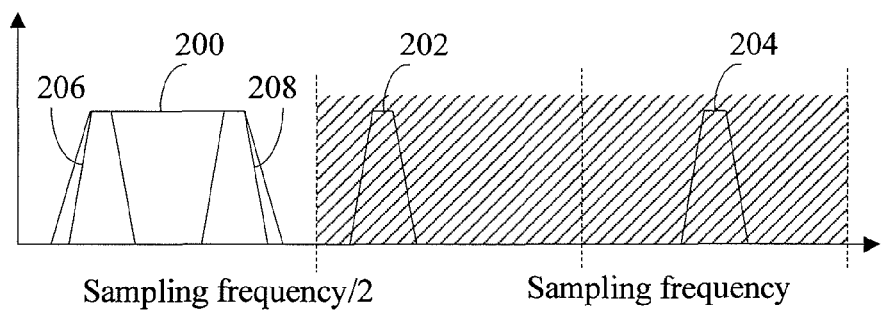
FIG. 2 is a schematic diagram of aliasing out-band crosstalk noise into the band at full amplitude.
Figure 3:
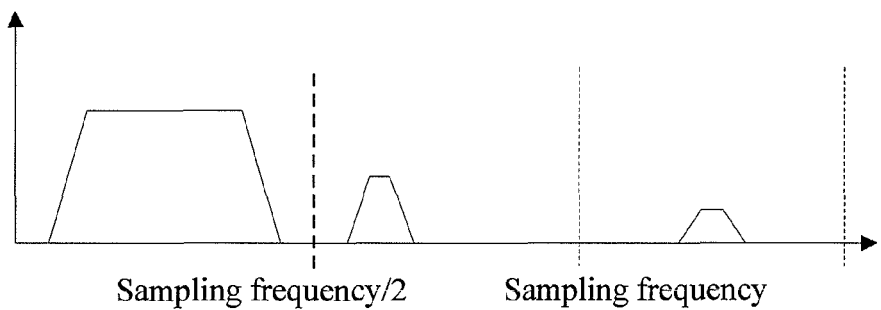
FIG. 3 is a schematic diagram of theoretic state free from aliasing noise after anti-aliasing filtering.
Figure 4:
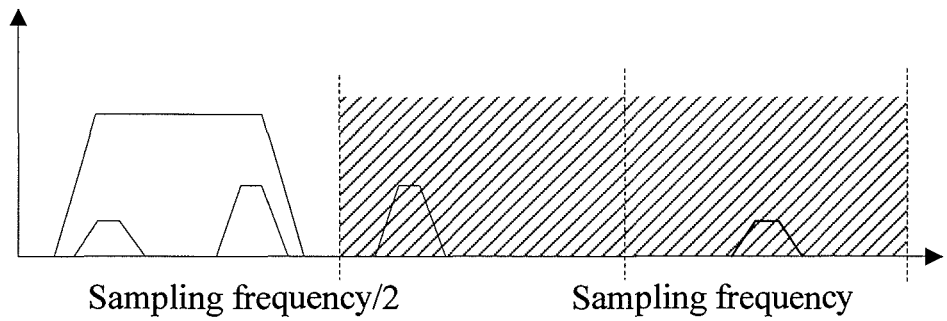
FIG. 4 is a schematic diagram of actual state with aliasing crosstalk noise after anti-aliasing filtering.
Figure 5:
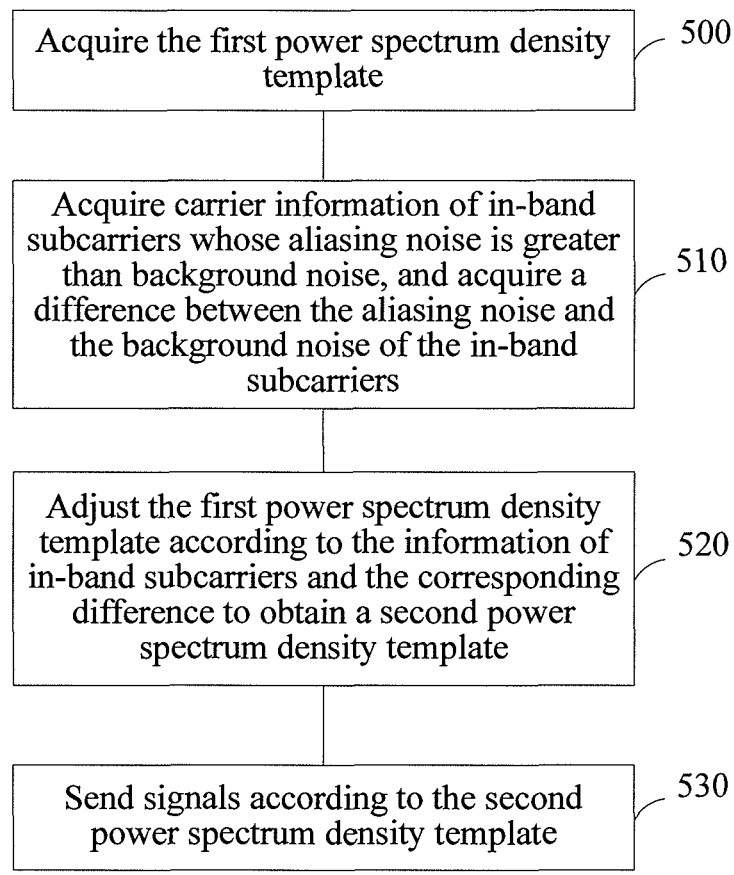
FIG. 5 is a flowchart of a method according to a first embodiment of the present invention.

The first embodiment of the present invention provides a method for eliminating aliasing noise in a multi-carrier modulation system. In the following embodiments, as an example, the subcarriers generated by a device in the CO equipment room fall within the first band, and are called "in-band subcarriers", and the subcarriers generated by the roadside cabinet fall within the second band, and are called "out-band subcarriers". As shown in FIG. 5, the provided method includes the following steps.

Step 500: acquire a first power spectrum density template.

The first power spectrum density template includes a transmitting power spectrum of the out-band subcarriers sent by the roadside cabinet.

Step 510: acquire information about in-band subcarriers, and acquire a difference between a aliasing noise and a background noise of in-band subcarriers.

The acquiring of information of the in-band subcarriers includes acquiring information of in-band subcarriers whose aliasing noise is greater than the background noise. Carrier information includes: carrier frequency value, sequence number of carrier, number of subcarriers, or any combination thereof.

Step 520: Adjust the first power spectrum density template according to the information of the in-band subcarriers and the corresponding difference to obtain a second power spectrum density template.

After the difference between the aliasing noise and the background noise of the in-band subcarriers is acquired, the power of the corresponding out-band subcarrier in the first power spectrum density template is adjusted according to the corresponding relationship of crosstalk. The adjustment method in this embodiment is to subtract the difference of the corresponding in-band subcarrier from the power of the out-band subcarrier.

Step 530: Send signals according to the second power spectrum density template.

In the method for eliminating aliasing noise provided by this embodiment, after acquiring the first power spectrum density template, the current difference between the aliasing noise and the background noise of the in-band subcarriers is calculated, and the transmitting power of out-band subcarriers is adjusted according to the calculated difference to generate a new power spectrum template, and signals are sent according to the new power spectrum template. The new power spectrum template takes account of the filtering performance of the anti-aliasing filter of the modem, namely, takes account of the aliasing noise, and fits in better with the actual crosstalk noise. Therefore, the aliasing noise is eliminated.

Figure 6:
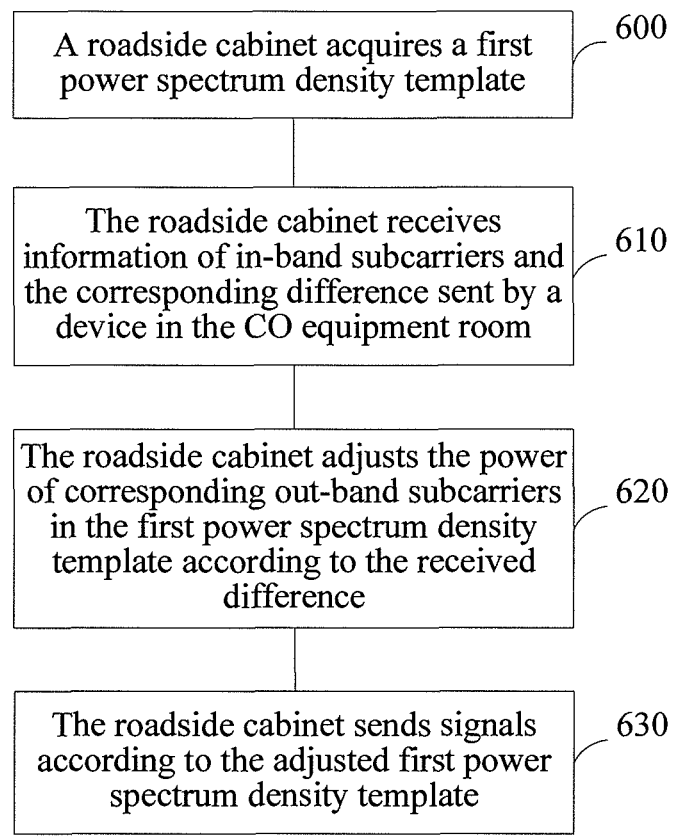
FIG. 6 is a flowchart of a method according to a second embodiment of the present invention.

The second embodiment of the present invention provides a method for eliminating aliasing noise. As shown in FIG. 6, the method includes the following steps.

Step 600: A roadside cabinet obtains a first power spectrum density template.

The roadside cabinet obtains the first power spectrum density template. In this embodiment, the first power spectrum density template specifies the transmitting power spectrum of subcarriers sent by the roadside cabinet, and may be RESULT TMASK, which is a final power spectrum template with DPBO well-known in the art. The roadside cabinet may acquire the first power spectrum density template through a DPBO-related calculation method, such as reducible maximum frequency (F1) calculation method or DPBO Minimum Power Spectral Density Mask (DPBOMPSD) calculation method. The first power spectrum density template may also be configured in a configuration database of the roadside cabinet, and the roadside cabinet acquires the first power spectrum density template by reading the configuration database on the roadside cabinet. For the details about acquiring of the RESULT TMASK, the F1 calculation method and the DPBOMPSD calculation method, see the solutions disclosed in the prior art.

Step 610: The roadside cabinet receives carrier information of in-band subcarriers and the corresponding difference sent by a device in the CO equipment room.

The carrier information of the in-band subcarriers may be carrier frequency values of the subcarriers, sequence number of the carriers, or number of subcarriers, or any combination thereof.

The device in the CO equipment room measures the current background noise of the in-band subcarrier, compares it with the original background noise, and finds the range of frequency of the subcarrier whose background noise is elevated. The background noise is elevated because of the filtering performance of the anti-aliasing filter of the modem is poor. Consequently, the crosstalk noise imposed by the out-band subcarrier on the in-band subcarrier is aliased into the band, and the aliasing noise is higher than the background noise.

The device in the CE equipment room acquires the information of the in-band subcarriers in the range of frequency, and calculates the difference between the aliasing noise and the background noise of in-band subcarriers within the range of frequency, and sends the carrier information of the in-band subcarriers in the above mentioned range of frequency and the corresponding difference to the roadside cabinet through a network management system.

Step 620: The roadside cabinet adjusts the power of the corresponding out-band subcarriers in the first power spectrum density template according to the received difference.

Since a crosstalk mapping relationship exists between the in-band subcarrier and the out-band subcarrier, for example, according to the symmetric relationship, the out-band subcarrier causes crosstalk noise to the corresponding in-band subcarrier. After receiving the subcarrier information and the corresponding difference, the roadside cabinet finds the power of the corresponding out-band subcarrier in the first power spectrum density template according to the crosstalk mapping relationship (such as symmetric relationship), and subtracts the difference of the corresponding in-band subcarrier from the power of the out-band subcarrier. In this way, the first power spectrum density template is adjusted to generate the second power spectrum density template.

Step 630: The roadside cabinet sends signals according to the second power spectrum density template.

The method for eliminating aliasing noise provided by this embodiment takes account of the filtering performance of the modem after the process of DPBO, acquires information of the subcarrier whose background noise is elevated through calculation, and calculates the amplitude of elevation of the background noise, in which the calculation method may be subtracting the original background noise from the elevated background noise, adjusts the transmitting power of the out-band subcarrier according to this amplitude, thereby eliminating the crosstalk noise aliased into the band, and improving the performance and stability of in-band services.

Figure 7:
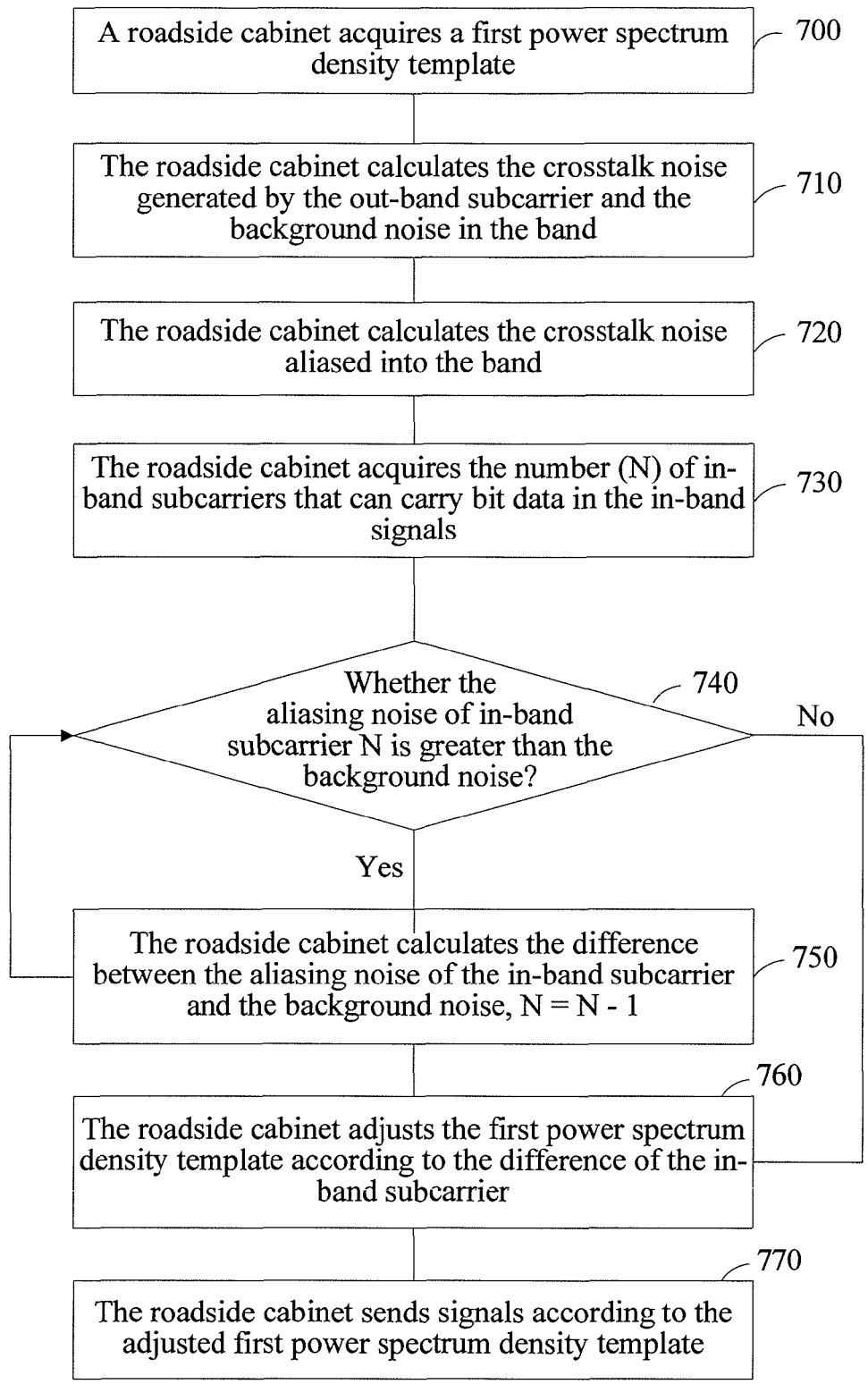
FIG. 7 is a flowchart of a method according to a third embodiment of the present invention.

The third embodiment of the present invention provides a method for eliminating aliasing noise. As shown in FIG. 7, the method includes the following steps.

Step 700: A roadside cabinet obtains a first power spectrum density template.

The method by which the roadside cabinet acquiring the first power spectrum density template is described in the second embodiment of the present invention and further description is omitted here.

Step 710: The roadside cabinet calculates the crosstalk noise generated by the out-band subcarrier and the background noise of the in-band subcarrier.

Therein, the crosstalk noise generated by the out-band subcarrier is the crosstalk noise caused by the out-band subcarrier to the corresponding in-band subcarrier. A Far End Crosstalk (FEXT) calculation method well-known in the art may be used to calculate the crosstalk noise generated by the out-band subcarrier and the background noise of the in-band subcarrier.

Step 720: The roadside cabinet calculates the crosstalk noise aliased into the band.

In the parameter configuration table of DPBO, an aliasing attenuation coefficient ATTENCOEFICIENT(i) is added, where i is the sequence number of the subcarrier that can carry bit data outside the band. The aliasing attenuation coefficient configured for the subcarrier may be acquired through a test, or provided by the manufacturer of the modem. The aliasing attenuation coefficient configured for the subcarrier may be fixed or dynamically adjustable, for example, adjusted according to the actual test result.

In step 710, the roadside cabinet has acquired the crosstalk noise generated by the out-band subcarrier. The crosstalk noise aliased into the band is a result of subtracting the corresponding aliasing attenuation coefficient from the crosstalk noise generated by the out-band subcarrier. Since a crosstalk mapping relationship exists between the out-band subcarrier and the in-band subcarrier, thus according to this mapping relationship, it is possible to locate which in-band subcarrier is affected (or which in-band subcarriers are affected) by the crosstalk noise aliased by each out-band subcarrier into the band, namely, locate the in-band subcarriers affected by the crosstalk noise aliased by each out-band subcarrier into the band. In this way, the aliasing noise of the in-band subcarrier is acquired.

Step 730: The roadside cabinet acquires the number (N) of in-band subcarriers that can carry bit data in the in-band signals.

Specifically, N=ceil (F1/4312.5), where ceil is a rounding-up function. Persons of ordinary skill in the art know how to obtain F1 and the description is omitted here. The subcarrier numbered N (subcarrier N) is the maximum subcarrier that can carry bit data in the in-band signals.

Step 740: Judge whether the aliasing noise of in-band subcarrier N is greater than the background noise.

The roadside cabinet compares the aliasing noise of subcarrier N with the background noise. If the aliasing noise is greater than the background noise, the procedure proceeds to step 750; otherwise, the procedure proceeds to step 760.

Step 750: The roadside cabinet calculates the difference between the aliasing noise of the in-band subcarrier and the background noise. Set N=N−1. Perform step 740.

Step 760: The roadside cabinet adjusts the first power spectrum density template according to the difference of the in-band subcarrier.

After the difference between the aliasing noise and the background noise of the in-band subcarriers is acquired, the power of the corresponding out-band subcarrier in the first power spectrum density template is adjusted according to the mapping relationship of crosstalk. The adjustment method in this embodiment is to subtract the difference of the corresponding in-band subcarrier from the power of the out-band subcarrier.

Step 770: The roadside cabinet sends signals according to the adjusted first power spectrum density template.

In the method for eliminating the aliasing noise provided by this embodiment, an aliasing attenuation coefficient is added in the DPBO parameter table. After the first power spectrum density template is obtained through DPBO, the aliasing noise in the band is calculated according to the added aliasing attenuation coefficient, and the amplitude of the elevation the background noise is acquired. The transmitting power of the out-band subcarrier is adjusted according to this amplitude. In this way, it is possible to eliminate the aliasing noise in the case of the filtering performance of the anti-aliasing filter of the modem is poor. The provided method is completely accomplished by the roadside cabinet without involving upgrade or modification of the far end device CPE.

Figure 8:
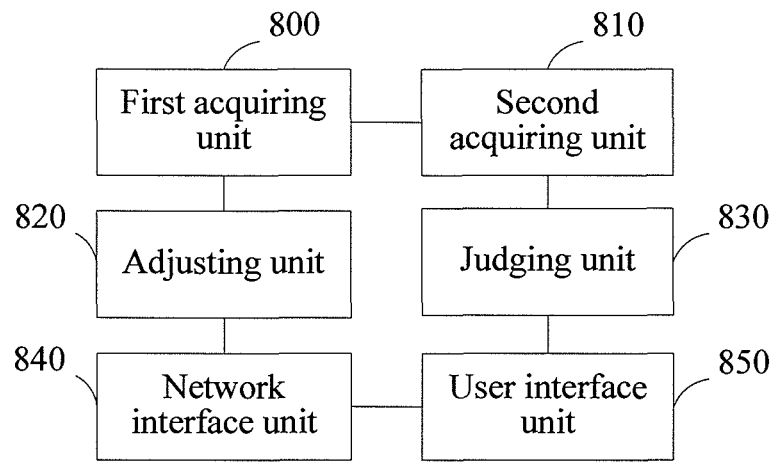
FIG. 8 is a schematic diagram of a structure of an apparatus according to a fourth embodiment of the present invention.

The fourth embodiment of the present invention provides a CO device. The provided CO device may be a roadside cabinet. As shown in FIG. 8, the CO device includes: a first acquiring unit 800, a second acquiring unit 810, an adjusting unit 820, and a user interface unit 850.

The first acquiring unit 800 is configured to acquire a first power spectrum density template.

The first power spectrum density template acquired by the first obtaining unit 800 may be RESULT TMASK; and the method of acquiring the first power spectrum density template may be DPBO or to read preset data, etc.

The second acquiring unit 810 is configured to acquire information of in-band subcarriers, and acquire the difference between aliasing noise and background noise of the in-band subcarriers.

Figure 9:
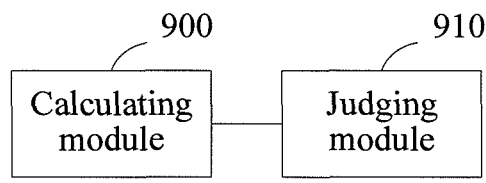
FIG. 9 is a schematic diagram of a structure of a second acquiring unit in an apparatus according to a fourth embodiment of the present invention.

As shown in FIG. 9, the second acquiring unit 810 includes a calculating module 900 and a judging module 910, therein.

The calculating module 900 is configured to calculate the crosstalk noise generated by the out-band subcarrier and the background noise of the in-band subcarrier. The calculation method may be FEXT, etc. According to the crosstalk noise generated by the out-band subcarrier and the preset aliasing attenuation coefficient, the crosstalk noise aliased into the corresponding in-band subcarrier is acquired, namely, the aliasing noise of the corresponding in-band subcarrier is acquired.

The calculating module 900 is also configured to acquire the number (N) of subcarriers that can carry bit data in the band.

The judging module 910 is configured to judge whether the aliasing noise of in-band subcarrier N is greater than the background noise, and if so, notify the calculating unit to calculate the difference between the aliasing noise and the background noise.

The adjusting unit 830 is configured to adjust the first power spectrum density template according to the information of the in-band subcarriers in the range of frequency acquired by the second acquiring unit 810 and the corresponding difference to obtain a second power spectrum density template.

The adjusting unit 830 acquires the information of the corresponding out-band subcarrier in the first power spectrum density template according to the crosstalk mapping relationship between the in-band subcarrier and the out-band subcarrier, and adjusts the power of the out-band subcarrier according to the difference of the in-band subcarrier to form the second power spectrum density template.

The user interface unit 850 is configured to send signals according to the second power spectrum density template.

The provided CO device further includes a network interface unit 840, which is configured to receive the range of frequency of the in-band subcarriers from the device in the CO equipment room, and the difference between the aliasing noise and the background noise of the in-band subcarriers in said range of frequency.

After receiving the in-band subcarrier information and the corresponding difference, the network interface unit 840 notifies the adjusting unit 830 to adjust the first power spectrum density template.

The CO device provided in this embodiment is capable of calculating the crosstalk noise aliased into the band, acquiring the difference between the aliasing noise and the background noise and then adjusting the power spectrum density template calculated through DPBO according to the difference. In this way, the transmitting power of the out-band subcarrier may be adjusted according to the crosstalk noise actually caused to the in-band subcarrier, thereby eliminating the aliasing noise without involving upgrade or modification of the CPE.

Figure 10:
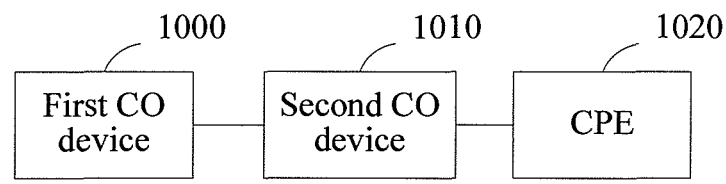
FIG. 10 is a schematic diagram of a structure of a system according to a fifth embodiment of the present invention.

The fifth embodiment of the present invention provides a multi-carrier communication system. As shown in FIG. 10, the system includes a first CO device 1000, a second CO device 1010, and a CPE 1020. The first CO device 1000 may be a device in the CO equipment room, and the second CO device may be a roadside cabinet.

The second CO device 1010 is configured to acquire a first power spectrum density template and information of in-band subcarriers whose aliasing noise is greater than background noise, and acquire the difference between aliasing noise and background noise of the in-band subcarriers.

After obtaining the difference between the aliasing noise and the background noise of the in-band subcarriers, the power of the corresponding out-band subcarrier in the first power spectrum density template is adjusted according to the difference to obtain a second power spectrum density template.

After obtaining the second power spectrum density template, the signals are sent according to the second power spectrum density template.

The roadside cabinet 1010 is also configured to receive the range of frequency of the in-band subcarriers from a device in the CO equipment room, and the difference between aliasing noise and background noise of the in-band subcarriers in the range of frequency. After receiving this information sent by the device in the CO equipment room, the roadside cabinet 1010 may also adjust the first power spectrum density template according to the information.

The system for eliminating aliasing noise provided by this embodiment, after obtains the first power spectrum density template through DPBO, further calculates the crosstalk noise aliased into the band as a result of the poor filtering performance of the anti-aliasing filter of the modem. The crosstalk noise aliased into the band elevates the background noise of the in-band subcarrier. By calculating the difference between the aliasing noise and the background noise, the transmitting power of the out-band subcarrier is thereby adjusted to eliminate the aliasing noise.

Persons of ordinary skill in the art understand that all or part of the steps of the method in the embodiments of the present invention may be implemented by a program instructing relevant hardware. The program may be stored in computer readable storage media such as ROM/RAM, magnetic disk or compact disc.

The above descriptions are merely embodiments of the present invention, but not intended to limit the protection scope of the present invention. Any modifications, variations or replacement that can be easily derived by those skilled in the art shall fall within the protection scope of the present invention. Therefore, the protection scope of the present invention is subject to the appended claims.

What is claimed is:

1. A method for eliminating aliasing noise in a multi-carrier modulation system, wherein: a range covered by frequency of subcarriers of the multi-carrier modulation system is divided into at least two non-overlapping bands which comprise a first band and a second band, each band comprises one or more subcarrier frequencies, and the method comprises:

acquiring a first power spectrum density template of the one or more subcarriers in the second band;

acquiring carrier information of the one or more subcarriers in the first band;

acquiring a number (N) of the one or more subcarriers in the first band that can carry bit data in the first band;

acquiring background noise of an Nth subcarrier in the first band;

acquiring a number (N) of the one or more subcarriers in the second band that can carry bit data in the second band;

calculating crosstalk noise generated by the Nth subcarrier in the second band;

acquiring the aliasing noise of the Nth subcarrier in the first band according to the calculated crosstalk noise of the Nth subcarrier in the second band and a preset aliasing attenuation coefficient;

judging whether the aliasing noise of the Nth subcarrier is greater than the background noise of the Nth subcarrier, and, if so, calculating a difference between the aliasing noise of the Nth subcarrier in the first band and the background noise of the Nth subcarrier in the first band;

adjusting the first power spectrum density template according to the carrier information of the one or more subcarriers in the first band and the corresponding difference to obtain a second power spectrum density template; and sending one or more subcarrier signals in the second band according to the second power spectrum density template.

2. The method according to claim 1, wherein: a range covered by the frequency of the one or more subcarriers from a device in a Central Office (CO) equipment room is the first band, and acquiring the carrier information of the one or more subcarriers in the first band and acquiring the difference between the aliasing noise and the background noise of the one or more subcarriers in the first band comprises:

receiving carrier information of the one or more subcarriers in the first band from the device in the CO equipment room, and receiving the difference between the aliasing noise and the background noise of the corresponding one or more subcarriers in the first band.

3. The method according to claim 1, wherein: adjusting the first power spectrum density template according to the carrier information of the one or more subcarriers in the first band and the corresponding difference comprises:

acquiring power of one or more subcarriers in the second band in the first power spectrum template according to a crosstalk mapping relationship between the one or more subcarriers in the first band and the one or more subcarriers in the second band, wherein the one or more subcarriers in the second band corresponds to the carrier information of the one or more subcarriers in the first band; and adjusting power of the one or more subcarriers in the second band according to the difference between the aliasing noise and the background noise of the one or more subcarriers in the first band.

4. The method according to claim 3, wherein: adjusting the power of the one or more subcarriers in the second band according to the difference of the one or more subcarriers in the first band comprises:

subtracting the difference of the one or more subcarriers in the first band from the power of the one or more subcarriers in the second band.

5. A Central Office (CO) device, comprising:

a first acquiring unit, configured to acquire a first power spectrum density template of subcarriers in a second band;

a network interface unit, configured to receive carrier information of a subcarrier in a first band;

a calculating unit, configured to calculate a number (N) of the one or more subcarriers in the first band that can carry bit data in the first band; calculate background noise of an Nth subcarrier in the first band; calculate a number (N) of the one or more subcarriers in the second band that can carry bit data in the second band; calculate crosstalk noise generated by the Nth subcarrier in the second band; acquire the aliasing noise of the Nth subcarrier in the first band according to the calculated crosstalk noise of the Nth subcarrier in the second band and a preset aliasing attenuation coefficient, and calculate a difference between the aliasing noise of the Nth subcarrier in the first band and the background noise of the Nth subcarrier in the first band; and a judging unit, configured to judge whether the aliasing noise of the Nth subcarrier in the first band is greater than the background noise of the Nth subcarrier in the first band, and, if so, notify the calculating unit to calculate the difference between the aliasing noise of subcarrier N in the first band and the background noise in the first band;

an adjusting unit, configured to adjust the first power spectrum density template according to the carrier information of the one or more subcarriers in the first band and the corresponding difference to obtain a second power spectrum density template; and a user interface unit, configured to send one or more subcarrier signals in the second band according to the second power spectrum density template.

6. A multi-carrier communication system, comprising a first Central Office (CO) device and a second CO device, wherein the first CO device is connected with the second CO device, wherein:

the first CO device is configured to send subcarrier signals in a first band; and the second CO device is configured to:
- acquire a first power spectrum density template of subcarriers in a second band,
- acquire carrier information of the one or more subcarriers in the first band,
- acquire a number (N) of the one or more subcarriers in the first band that can carry bit data in the first band,
- acquire background noise of an Nth subcarrier in the first band,
- acquire a number (N) of the one or more subcarriers in the second band that can carry bit data in the second band,
- calculate crosstalk noise generated by the Nth subcarrier in the second band;
- acquire the aliasing noise of the Nth subcarrier in the first band according to the calculated crosstalk noise of the Nth subcarrier in the second band and a preset aliasing attenuation coefficient,
- judge whether the aliasing noise of the Nth subcarrier is greater than the background noise of the Nth subcarrier, and, if so, calculating a difference between the aliasing noise of the Nth subcarrier and the background noise of the Nth subcarrier,
- adjust the first power spectrum density template according to carrier information of the subcarriers in the first band and the corresponding difference to obtain a second power spectrum density template, and
- after acquiring the second power spectrum density template, send subcarrier signals in the second band according to the second power spectrum density template, wherein the second band does not overlap the first band.

* * * * *